May 2, 1939.　　　　　T. BRADY　　　　　2,156,901
METHOD AND APPARATUS FOR FEEDING AND DISTRIBUTING SLUDGY MATERIALS
Filed Dec. 9, 1936　　　3 Sheets-Sheet 3

INVENTOR
Thomas Brady
BY
ATTORNEY

UNITED STATES PATENT OFFICE 2,156,901

METHOD AND APPARATUS FOR FEEDING AND DISTRIBUTING SLUDGY MATERIALS

Thomas Brady, Bloomfield, N. J., assignor to Bakelite Building Products Co., Inc., New York, N. Y., a corporation of Delaware Application December 9, 1936, Serial No. 114,909

22 Claims. (Cl. 91—44)

This invention relates to improvements in methods and apparatus for feeding and distributing sludgy materials as surfacings or coatings for products to be so treated. More particularly, it relates to the feeding, calibration, and distribution of a material whose principal ingredient is a cement, to a web or elements thereof, which may be of asphalt impregnated and coated mineral surfaced roofing material, such as described and shown in the patent to Harshberger 1,913,667, granted June 13, 1933. Furthermore, the invention is particularly directed to improvements in the process and apparatus shown and described in an application of Norman P. Harshberger, Ser. No. 26,770.

The feeding and distributing of sludgy materials, such as cement, in a wet state, is a problem of considerable proportion. Some of the difficulties to be encountered become apparent when it is attempted to produce upon articles to be so treated, coatings or surfacings of substantial thinness, high uniformity, as well as substantial uniform plasticity, and to feed and distribute the material continuously to produce substantially unbroken coverings thereof. Such characteristics are desirable, for instance, in the manufacture of cement surfaced roofing material where it is proposed to provide measured amounts of coating composition per unit area or according to a predetermined arrangement in order to make a product of substantial uniformity. Likewise, it has been found desirable in certain instances in treating this type of product, to build the coating of several thin applications of the composition, instead of a single coat of equivalent thickness; such providing improved coating structures and in certain instances effecting economy in ingredients, for instance, coloring pigments, by omitting such substances in one or more of the coating applications.

In seeking a solution to these problems the various means and methods proposed for applying liquids, paints, size, powders, etc. have been considered. These have included among others, spray or other air-blast methods, liquid spatter brush and roll combinations wherein feed of the material is accomplished by a roll dipping in a trough, and dusting brush and feed roll combinations wherein the fed material is dumped upon a brush. Also certain of these processes have included idle rolls or bars as scrapers or feed controllers. Such methods are unsuitable for the purposes of this invention and for handling sludgy compositions such as a wet cement. The first type of process results in separation of liquids from solids, areas of concentration of coating, trapped air, and clogging of equipment; the second, produces an irregular feed as it depends upon the adhesive qualities of the product and fails to carry off material continuously or in uniform amounts, and is useless for sludgy compositions; the third results in an irregular spatter coating as neither the dumping nor discharge is uniform. Moreover, the proposed feed controllers would not operate as such with sludgy compositions, as the materials would dry upon them and build up to cause clogging. Also, the idle rolls would only operate intermittently and would jam if anything but liquids were handled.

Harshberger, supra, was probably the first to approach a solution. The process and apparatus disclosed by him in his application, aforesaid, is capable of producing coatings of the character desired, but is dependent upon exacting and substantially ideal feeding conditions to obtain production uniformity. Obviously, such conditions are not generally met in actual manufacture where it is necessary to cope with variations in materials and their sizes, and with unskilled labor. Under these latter conditions it has been difficult with the Harshberger apparatus to control the feed of material to consistently obtain thin coatings, uniform coatings and coating applications free from streaking, for the feeding was affected by differences in the pressure of the hopper-stored material, by the presence of chunks of solid foreign matter, dried composition, or aggregate in the fed composition of greater size than the coating thickness to be delivered. Also the method and means did not permit of ready adjustment or control of different types of fed materials. In production, these difficulties are conducive to rejected material, for the available means cannot cope with problems of the aforesaid character arising during any operation.

With the foregoing and other ends in view, the present invention contemplates the provision of methods and means whereby desirable and consistent results may be obtained and the enumerated difficulties as respects the prior art and Harshberger may be either controlled or entirely overcome.

It is therefore the general object of this invention to provide improved methods and means of the character under consideration.

Another object of the invention is to provide a method and means whereby sludgy compositions may be uniformly fed and distributed as coatings or surfacings.

A further object of the invention is to provide a method and means whereby thin uniform coating applications of a wet-cement composition may be made.

An additional object is to provide a method and means of uniformly feeding and impelling sludgy compositions.

An additional object is to provide a method and means to move and trowel a sludgy material to feed a measured stream thereof in layer form.

Another object is to provide a method and means to feed a moved and trowelled mass of sludgy material in measured amounts at a uniform rate and spread the mass over a surface to be treated.

A further object is to provide a source of supply with an adjustable, resilient, rotatable gate member to facilitate feed control.

Another object is to provide a method of overcoming streaking when feeding a substantially thin layer of sludgy material to a surface from a source of supply containing solid foreign matter, comprising feeding the sludge between a pair of moving surfaces at least one of which is resilient or displaceable.

A further object is to provide a method and means of manually operating a driven gate roll to release solid streak-creating material from a fed sludgy mass.

Another object is to provide a method and means of automatically ejecting solid foreign matter with a measured stream of sludgy composition with minimum detriment to the operations conducted.

Another object is to provide a method and means of feeding and distributing measured layers of sludgy material comprising coarse and fine solid materials.

A further object is to provide a hopper or fountain supply means with at least one movable partition for providing a sectional compartment with a desired size discharge outlet and means associated with said partition and movable therewith, enabling storage of material within the selected compartment only.

An additional object is to provide an improved impeller for distributing sludgy compositions.

Another object is the provision of an adjustable feed control element that may be readily and accurately calibrated to produce uniform coating applications.

Another object is the provision of apparatus of the character indicated, which is simple in construction, easily assembled, in which the parts may be readily repaired or replaced, which will operate continuously, and in a uniform manner, which may be readily controlled, and will efficiently carry out the functions for which it is indicated. Further, the invention comprises the various steps to be carried out and the relation and sequence of one or more of such steps with respect to each other or others and the apparatus embodying features of construction, combination of elements, and arrangement of parts, all as exemplified in the disclosure herein.

These and other objects of the invention will in part be obvious and in part be pointed out in the subsequent detailed description, and in the claims taken in conjunction with the accompanying drawings, forming a part thereof, in which certain preferred embodiments have been described in detail for purpose of illustration. Furthermore, inasmuch as the methods and apparatus are particularly applicable to the cement surfacing of roofing and siding materials, the description has been particularly directed to this embodiment but it will be understood that the methods and means are applicable to other applications and other materials, and such modifications as may be within the spirit of the invention are therefore contemplated.

In drawings.

The invention provides methods and means in the functioning and application of which various steps may be performed in some desired sequence. While in certain cases, all or some of the steps will be carried out, the invention is by no means limited to the performance of a method involving, or the use of apparatus for performing, any particular group or sequence of such steps. As an example of a method such as contemplated by the invention, reference may be had to a mode of operation which may be provided by the means to be described, and which includes withdrawing a stream of sludgy composition from a source of supply with controlled trowelling of said composition with respect to the withdrawing means, to continuously and substantially regularly deliver uniform and/or predetermined amounts of composition in one or more adjacent streams of desired width and subsequently, removing the composition layer from the withdrawing means and spreading the fed material as by impelling above moving elements, such as a web or section of composition or prepared roofing, commonly known to comprise of a bitumen impregnated fibrous base coated with a layer of asphalt adhesive or the like, and having granular material, for instance crushed silica, embedded therein to provide a surfacing or coating on such base material over the granular material in a desired area thereof.

One embodiment of the apparatus for carrying out such method is exemplified in the drawings, wherein similar reference characters denote similar parts.

Referring to Figs. 1–6 inclusive, the apparatus in general comprises side frames 20 and 22 carrying suitable bearings and members for supporting and forming a base to which the various parts are secured. The side frames are suitably reinforced and spaced by shouldered spacing rods 24. An endless conveyor belt 26, is operated between the side frames and over the length of the apparatus and conveys articles to be treated to and from the machine. Coating units 28 and 30 are positioned upon the frames 20 and 22 at suitable locations and with their operating parts straddling the conveyor belt 26, and out of contact therewith, sufficient clearance being left to permit free movement of the material to be treated, whereby such may receive a surfacing of coating composition in its relative movement with respect to said units.

The coating units 28 and 30 may each comprise a hopper or fountain 32 comprising forward sides 34, rear sides 36, and ends 38, suitably connected to provide an enclosure for receiving a supply of sludgy coating composition 40 from an outlet 42 of suitable storage and bulk mixing units not shown. The hopper end walls are preferably supported by brackets 44 carried respectively on the frames 20 and 22. The opposite brackets 44, are provided with suitable bearings for the shafts 46, of rotatable hopper discharge drums or feed rolls 48 and 50 which extend transverse the machine the length of the hoppers and substantially form the bottoms thereof.

A feature of the invention consists in the construction of the hopper discharge roll. The roll comprises a pair of hubs 52 and a tubular shell 54. The roll is assembled such that the hubs may be readily removed to replace a new shell, this being desirable in instances where the feeding conditions are altered as for feeding different materials or different quantities thereof and a different shell is desired for greater efficiency. The hubs and shell are preferably connected by a plurality of suitable set screws 55, radially positioned on the hub rims and having dowel tips which enter the inner surface of the shell to position the hubs endwise. The hubs are secured to the shaft 46 by set screws or pins not shown.

The discharge rolls 48 and 50 may have grooved surfaces formed as by helical extending grooves 56 which are adapted to receive the sludgy composition from the hoppers 32 and to feed the same to suitable impellers to be described. The grooves 56 may be for instance of V, square, or buttress shape, but are preferably V-shaped and extend in a helix about the drum surface, as such facilitates removal of the material from the hopper and the impeller more readily removes the composition therefrom in the coating operation. The size and pitch of the grooves will be determined by the conditions of feed, the speed of operation and type consistency of the composition. In one embodiment helical V-shaped grooves with a pitch of 14 turns to the inch were found satisfactory.

Depending upon the desired surface coating requirements the discharge rolls of the coating units 28 and 30 may have similar or different surface grooves as the case may be.

A particular feature resides in the provision of a driven gate roll 58. This roll may be of resilient material such as rubber, or it may be of metal. However, in view of certain advantages obtained from it in operation, I prefer, in the present embodiment, one of rubber and in the form of a covering on a metal core. In the embodiment shown in Fig. 3 the roll is located adjacent the discharge roll 50 with the rolling circles of both closely related. The gate roll is further positioned at the discharge side of the hopper, i. e. at that side from which the discharge roll 50, emits in operation. In the illustrated embodiment, the roll is beneath the forward side wall 34 of the hopper and extends in the direction of the discharge roll axis. It will be noted that a portion of its surface forms part of the hopper enclosure. The gate roll is supported in suitable bearings located in end brackets 60 and 62. These brackets are carried upon hinge studs 64 and may be swung through an arc in response to adjustment of threaded connecting rods 66 pivotally secured to the brackets 60 and 62 and passing through brackets 68 fixed to the supports 44, where they are held by threaded adjustment nuts 70 secured against the opposite bracket faces when the correct position of the gate roll has been determined.

Figure 3:
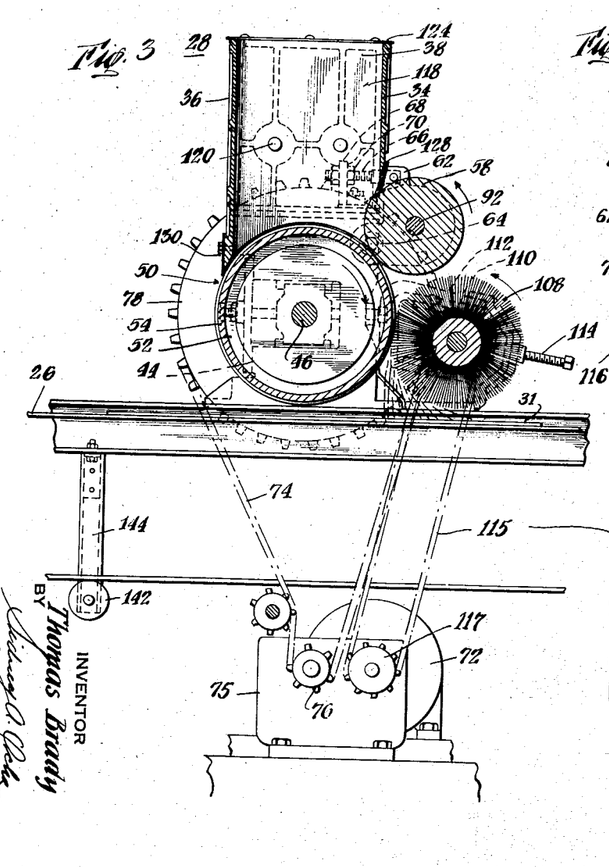
Fig. 3 is a longitudinal section through 3—3 of Fig. 1 drawn to an enlarged scale.
Figure 4:
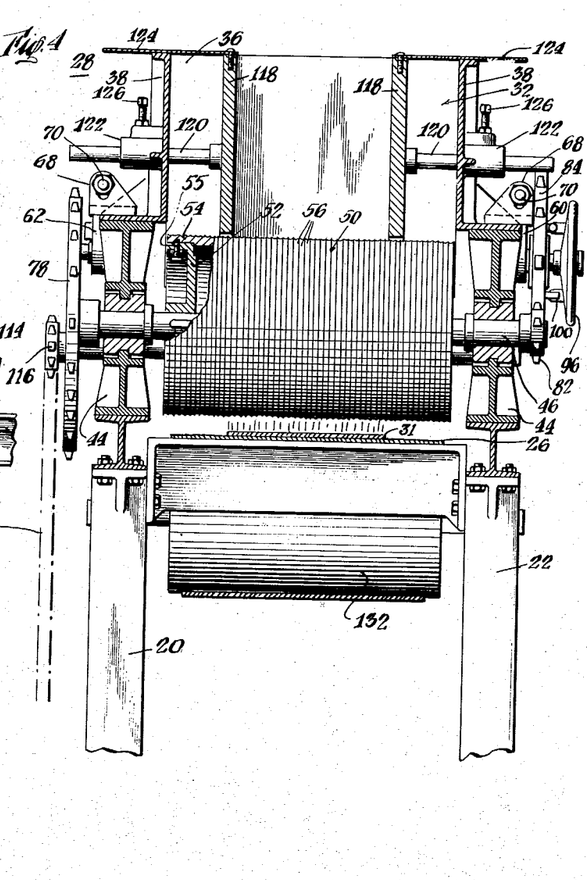
Fig. 4 is an enlarged transverse section through 4—4 of Fig. 1 drawn to an enlarged scale.

It will be noted that in the embodiment of Fig. 3 the gate roll bracket pivot center permits adjustment of the gate roll face, both away from and along the discharge roll circle so as to provide a fine adjustment. In operation the gate roll is adjusted relative to the discharge roll so as to effect the desired discharge of material from the hopper. It is preferred, however, that the discharge roll have a grooved face, with the groove section selected to roughly provide, when filled, the desired quantity of material and in such instances the gate roll be positioned just short of contacting the discharge roll; a clearance of about $7/1000$ of an inch, having been found satisfactory.

The dimensions of the discharge and gate rolls are selected to effect smooth operation and good trowelling and feed control. Satisfactory sizes have been found to be 14" and 8", respectively, but it will be understood that they may be altered to suit the requirements of each operation. The discharge roll and gate roll are driven from a suitable source of power, for instance, by a motor 72. In the embodiment illustrated the motor drives a gear reduction unit 75, and the low speed output thereof imparts power to the discharge roll through a chain 74 and sprockets 76 and 78. The gate roll receives its power through a chain 80 and sprockets 82 and 84, the latter secured to the discharge roll shaft.

The surface speed of the discharge roll will be dependent somewhat upon the coating rate desired, and the character of the fed composition. In feeding a wet cement composition it has been found satisfactory to operate the hopper discharge and gate rolls at respective speeds in the proportion of about 10 to 2.75. Thus it will be observed that the gate roll surface speed is considerably less than that of the discharge or feed roll, with the result that in operation the gate roll effects a wiping and/or smoothening action herein referred to as "trowelling" upon the sludgy composition against the feed or discharge roll surface, and continuously levels and reduces the thickness of the layer being formed until a minimum is reached at the nip of the rolls. This working upon the sludgy composition by the gate roll insures a constant and uniform delivery of material, whether such be fed in thin or thick layers. The operation is, however, particularly adapted for feeding thin coatings. Where, as in the preferred construction, the hopper feed roll is grooved, it will be seen that the action of the trowel or gate roll also insures filling of the grooves and the amount of material delivered by the discharge roll may be confined to that substantially in the grooves, unless the amount be increased by suitable positioning of the gate roll. Furthermore, the trowelling action of the gate roll is believed to set up a desirable back pressure, which neutralizes any static pressure effects of the sludgy composition in the hopper, if the level of material therein is changed during operations, and thereby avoids an uneven feed as might occur under certain conditions where such a roll was not provided. It is preferred that in no case should the gate roll contact or press upon the feed roll as grinding of the surfaces due to different relative speeds of the members may occur.

Furthermore, as indicated by the arrows in Fig. 3, it is preferred that the directions of rotation of the hopper discharge roll, and the gate roll, be toward each other, with the hopper discharge or feed roll rotating in a direction toward the inner face of the forward wall of the hopper adjacent which the gate roll is located. In this manner differences in the surface speed of the rolls from zero up, may be obtained and the character of trowelling action be adjusted. It is to be understood, however, that the gate roll may rotate in an opposite direction to the hopper feed or discharge roll under conditions that require such operation. However, in such instances it may be desirable to limit the feed roll surface speed to one permitting ideal trowelling action.

Sludgy compositions, for example, hydraulic cement mixes, used in the present process for coating roofing may include both coarse and fine aggregates and there exists variations in the grading of the batches of materials used. While it is attempted to employ materials meeting definite specifications it may be expected that at times sizes outside the set limits will creep in. For example, it has been found in operation, that aggregate particles of a size greater than the thickness of the emitted coating may be expected in the composition or even that large hardened particles of the composition itself or other foreign solid matter may become mixed in its preparation. Under such conditions, when these so called foreign substances reach the nip of the feed and gate rolls, jamming may occur and/or the composition may be prevented from passing out with the feed roll at the point or points at which such foreign matter may be located. Thus, as the feed or discharge roll leaves the gate roll, it may not carry the normal amount of coating in certain areas and in distribution such may cause a streaky surface effect upon the article to be treated.

In order to obviate the effects of such action and to substantially eliminate its occurrence, the gate roll is made with a resilient face, thus permitting a give action when coarse particles or other foreign matter is obtained at the nip of the rolls. In the exemplified form illustrated in Fig. 5, such a roll may comprise a metal core 86 and a resilient surface 88 of a resilient material, preferably a tough abrasive-resisting compound of uniform composition and texture. An abrasive-resisting rubber compound having a density of 105–110 as obtained by a plastometer reading with an ⅛" pin, has been found satisfactory for operations with a wet-cement composition. Where the size of any foreign or coarse solid matter is not greatly in excess of the distance across the nip of the rolls, such material may be readily ejected by being gripped between the rolls, the gate roll surface deflecting to accommodate the oversize in particle and such deflection being generally confined to the particular location of the ejected material. However, it has been stated that the discharge and gate rolls preferably operate at different surface speeds and the gate roll has in effect a dragging action upon the fed material. It is therefore found that where the foreign matter is of considerable size the mere deflection of the gate roll surface may not be sufficient. The invention, therefore, provides as a further feature means to automatically or manually alter the surface speed of the gate roll. This is carried out by either the action of power furnished through the feed roll drive or by manual operation. In the disclosed embodiment, with particular reference to Figures 5 and 6, the gate roll is connected to its power drive through a sprocket 84, and a clutch which may be manually operated to throw the gate roll out of drive, so that it may idle or be manually rotated in either direction by the operator, at any desired speed, without stopping the machine or coating operations. The clutch comprises a fixed member which as shown may consist of the sprocket 84 positioned on the gate roll shaft 92 and having a free running fit thereon. The shaft 92, is carried in bearings 90 mounted upon the brackets 60 at opposite ends of the shaft and is held endwise by collars 91. The sprocket or clutch driving segment is further located between the bracket 60 and a collar 93 which may be fixed by a set screw or pin and is provided with one or more projecting driving teeth or fingers 94. In the present embodiment two are provided, spaced substantially 180° apart on a circle of substantial radius. The driven clutch segment comprises a slidable member 96 which may, as in the exemplified embodiment of Fig. 5, be a hand wheel. This member is splined to the shaft 92 as by a key 98 so as to rotate with it and in addition is provided with one or more projecting teeth or fingers 100, in the present embodiment two, spaced substantially 180° apart on a similar radius to the projections 94 of the drive member 84. The slidable clutch member 96 may be adjusted so that its finger or fingers 100 may be driven by those of the driving member 84 or be disengaged therewith. Thus, in normal operation the two members are in engaged position and movement is imparted to the gate roll by the sprocket 84 through the coupling provided. In order to insure contact with all of fingers 94, where more than one is used, suitable set screws 102, are provided on the fingers 100, to adjust for proper contact, and also to adjust the free slip angle between the fixed and driven members.

Figures 2, 5, 6:
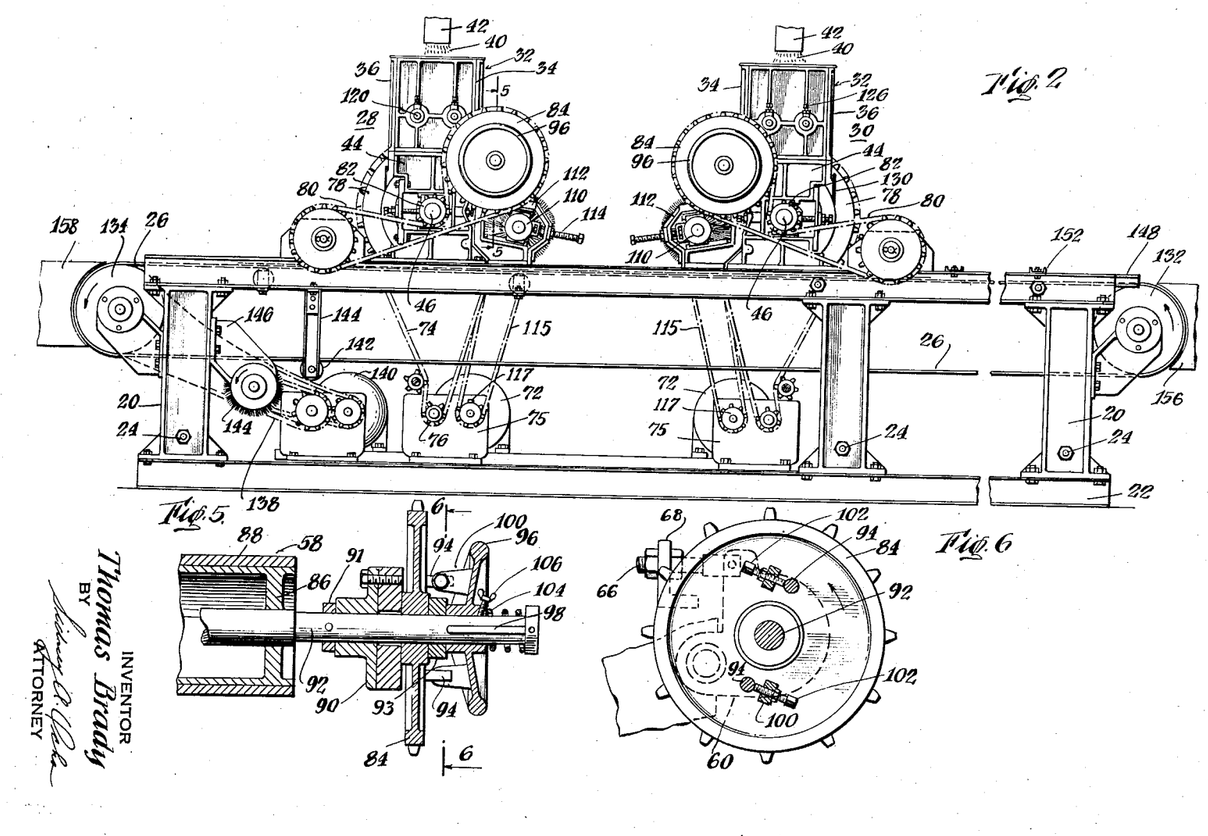
Fig. 2 is a side elevation thereof.
Fig. 5 is an enlarged partial cross-section taken at 5—5 of Fig. 2 showing an embodiment of the gate roll, and manual operating means.
Fig. 6 is an end view and section taken at 6—6 of Fig. 5.

In operation, if the gate roll turns in opposite hand to the discharge or feed roll, (in such case the surfaces at the nip of the rolls will move in the same direction) foreign matter in the hopper reaching the nip of the rolls, will if not of too great length be automatically ejected, as the arrangement of clutch fingers permits the gate roll to be driven by the discharge roll through the interposed material, and to alter its surface speed to the higher surface speed of the discharge roll through a portion of a revolution, by causing the finger on the slidable or driven clutch member to move ahead of the drive fingers of the driving clutch member or sprocket 84 through the angle between adjacent pins of the clutch. However, should the permissible movement be insufficient or should the gate roll have the same direction of rotation as the discharge roll (the surfaces at the nip of the rolls would then move in opposite directions) any foreign material would ordinarily be pushed away from the point of apparent mesh of the two rolls and cause streaking. In such instances, the manual control is brought into play, and the operator disconnects the gate roll from the normal drive by disengaging the clutch segments through pulling endwise on the hand wheel of the driven clutch segment 96. Upon disengagement of the clutch fingers, the gate roll may be driven at the will of the feed or discharge roll through the interposed foreign material, even to the extent of reversing its direction of rotation where it has previously been otherwise driven. Furthermore, the operator himself, upon disconnecting the gate roll from the normal drive may give the gate roll an oscillating motion of any desired surface speed to help in ejecting the foreign matter. In order to prevent disengagement of the clutch members in operation means such as a compression spring 104 is provided to normally hold the slidable clutch member 96 in engaged position and to automatically return such member to drive position after any declutching operation by the operator. However, it may be desired to lock the member 96 in or out of position and for this purpose means such as a locking thumb screw 106 may be provided. Where the latter is provided the spring 104 may if desired be dispensed with.

Upon emitting at the discharge side of the hopper, the hopper feed roll with its surface layer or covering of sludgy composition moves within the range and action of an impelling device extending parallel to the discharge roll, which in this instance may be a rotary brush 108, moving at a considerable surface speed so that its bristles may impart a throwing and/or impelling action to any material which is released from them by reason of centrifugal force caused by the rotation and any flexure set up in the bristles. The impeller or rotating brush is located adjacent the hopper feed roll and above the moving conveyor but preferably substantially in a position permitting the greatest impelling efficiency to be obtained without contacting the surface of the material to be treated, and to avoid an excessive throwing of material in a direction parallel or away from the surface to be treated. In the illustrated arrangement of Fig. 3 the greatest portion of material is impelled at an angle substantially normal to the conveyor, the remainder at a more inclined angle to the horizontal thus insuring full coating of any surface irregularities such as exist on a mineral surfaced roofing sheet. The impeller bristles in moving toward the feed or discharge roll come in contact with the sludgy mass carried thereon, pick up this material and discharge it, upon passing the segment of apparent contact between the two elements. The bristles of the impeller may, if desired, actually contact all or part of the entire feed roll surface at the line of tangency of the members. However, it is preferred in order to reduce wear to a minimum, that the bristles substantially only contact the fed composition. It has been found in some operations that removal of all the composition is possible with this character of operation. The reason therefore, is not known but is believed to be suction. The advantages are particularly apparent where surface irregularities, such as grooves, etc. for carrying the sludgy composition are provided on the feed roll.

The impeller member is supported in suitable bearings 110 carried in supports 112 on each side of the machine. The impeller is adjustable with relation to the surface of the hopper feed roll, by altering the position of the bearings 110, upon the inclined faces of the support 112, by means of set screws 114 fixed in a strap forming a part of the support 112, and which engage a projection on the impeller shaft bearings 110. Upon rotary movement of the adjustment screws, the bearing blocks are movable along the inclined supporting faces, aforesaid. Also, a lock nut is provided to fix the final position of the impeller after such has been determined. It will be noted that the impeller may thus be readily adjusted with a high degree of accuracy and within as close limits as the conditions of operation may require.

The impeller, which in the exemplified form is a rotary brush has been selected of such diameter as to obtain a bristle length that will provide softness of flexure without causing permanent deformation of the bristles in the process of picking up coating material from the hopper feed roll and throwing it therefrom. In order to obtain a brush of minimum diameter, and yet obtain the aforesaid characteristics, the impeller is preferably constructed so that the bristles are grouped upon a continuous band holder, which is wound upon an arbor at a desired pitch to obtain the required fullness of brush. This mode of construction has the further advantage of uniformly positioning the bristle points of the entire brush roll. It also permits the use of a minimum size of arbor and enables bringing the point of discharge of material as near as possible to the surface to be treated. The impellers are driven from the high speed output of the reduction unit 74 through a chain 115 and sprockets 116 and 117.

In operating with certain sludgy compositions, such as wet hydraulic cement, it has been found that such has considerable abrasive action upon the operating parts, and in order to help reduce action of this character upon the impeller a feature of the invention is to provide an impeller with bristles of steel, which are cadmium plated. Such coating in addition to resisting wear, aids in preventing corrosion from taking place during non-operation of the machine.

It has been previously stated that the hopper feed or discharge roll substantially forms the bottom of the hopper enclosure, and that the exemplified enclosure comprises side and end walls. In the illustrated embodiment of Figs. 3 and 4, the side walls of the hopper are arranged substantially vertical and the lower edge of the rear wall substantially contacts the discharge roll surface throughout its length, that is, it is placed in position as closely to such surface as possible without creating a definite drag. The opposite or forward side wall is positioned as to be spaced from the face of the gate roll surface.

In certain instances, in the operation of the coating apparatus it may be desirable to apply coating material in a particular area of the articles to be treated or in bands of a particular width. In order to readily accomplish this result the hopper in the illustrated embodiment is provided with a pair of adjustable inner end walls 118. The adjustable walls are rigidly connected to studs 120 of suitable size to support their weight and said studs are slidably adjustable in closely fitting bearings 122 forming part of the hopper end walls 38. The studs are preferably of sufficient length to permit adjustment of the inner walls to any position within the hopper extremities. Moreover, a bearing length is preferably provided to reduce to a minimum any tendency of the inner walls to cock due to the clearance provided between the stud members and their respective bearing. The forward and rear side edges of the inner walls or shaped to conform to the contour of the forward and rear sides of the hopper and are preferably in sliding contact with the inner faces of these sides to substantially prevent leakage of material around these edges. The bottom edges of the inner walls are preferably shaped to follow the contour of the hopper feed roll and the gate roll. Due to the support provided by the stud members and bearings, a sliding clearance may be provided between the lower edge of the adjustable walls and the feed roll and gate roll surfaces thereby preventing any drag of the walls upon these moving parts.

Thus, it will be apparent that by the means provided the composition to be fed is received into the space between the forward and rear walls of the hopper and the adjustable inner walls of this unit.

In order to prevent any of the sludgy composition from getting into the space which may exist between the end walls of the hopper and the adjustable inner walls, and which may result where the material is, for instance, a cement, in such material hardening upon the feed roll face or causing clogging or damage to the machine, the adjustable inner walls are provided with suitable cover pans 124 of sufficient size to cover the openings created in the movement of the inner walls. The pans are fixed to the inner adjustable walls and adjust themselves in response to movement of said walls. Moreover, the pans have the feature of aiding in the support of the inner walls to prevent dragging of the lower edge thereof upon the feed roll when said walls are adjusted to their innermost position or position of greatest overhang from the bearing supports 122. The cover pans are therefore constructed of suitable material to provide rigidity and strength for supporting the inner walls and are seated upon the top surface of the hopper housing. In order to fix the position of the adjustable inner walls suitable lock screws or clamping devices 126 are provided at the end wall bearings for fixing the position of the studs 120. Where the clamps are set screws, suitable flats are provided upon the surfaces of the studs 120.

In order to prevent any of the coating composition from forcing its way out between the upper surface of the gate roll and the adjacent forward side wall of the hopper, a resilient wiper 128, preferably of laminated rubber fabric is fixed adjacent one edge of the hopper side wall, in a position parallel to the hopper roll surface and pointed toward the interior of the hopper, as to have its lower or free edge wipe upon the gate roll surface over the entire extent of its length. Obviously, the inner adjustable walls of the hopper are suitably contoured to follow this element. Furthermore, the rear side wall of the hopper is provided with a doctor knife 130, at its point of relation with the hopper feed roll to keep the sludgy material in the hopper and to scrape off any foreign material clinging to the hopper roll surface as it moves to re-enter the hopper.

Figure 1:
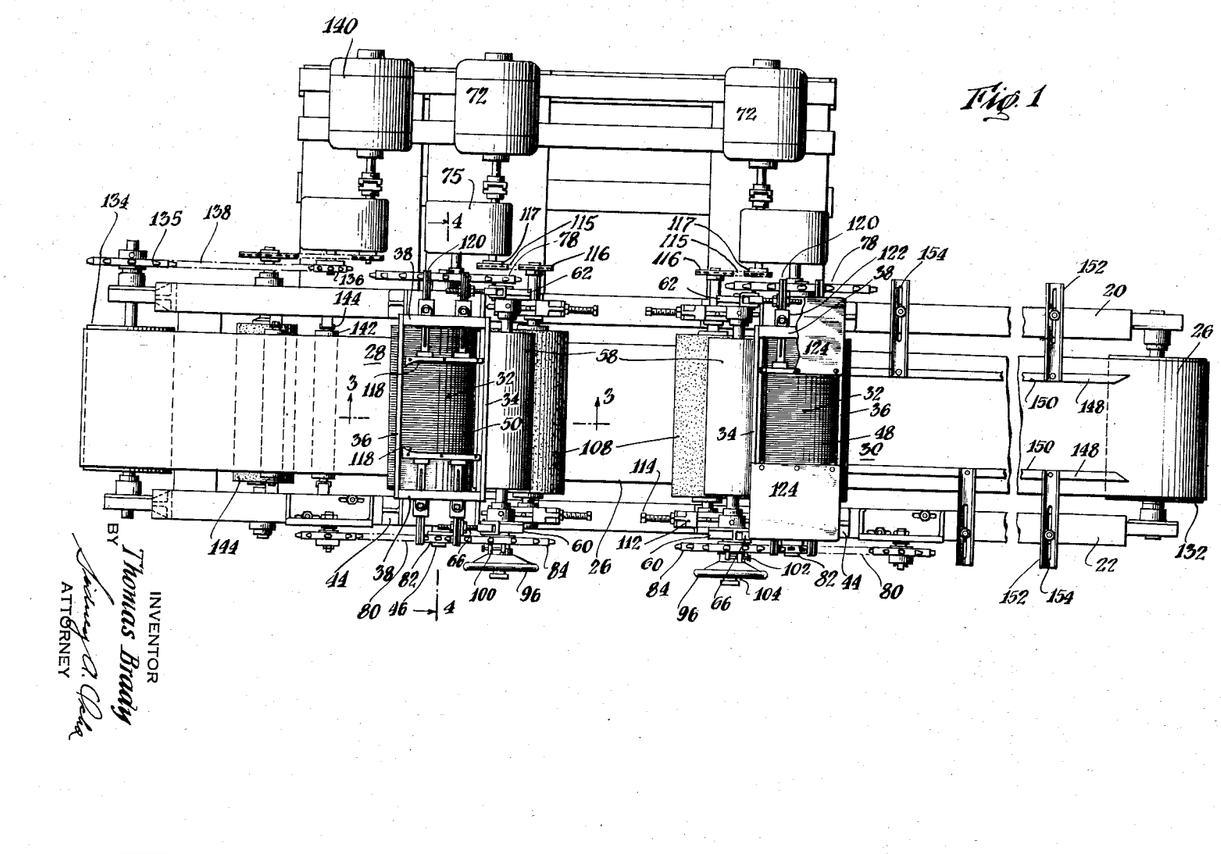
Fig. 1 is a plan view of a machine constructed in accordance with the preferred embodiment of the invention.

It is to be observed from Figs. 1 and 2 of the drawings, that the endless conveyor belt provided passes over a pair of drums 132 and 134 positioned at the extremities of the machine. Drum 132 is driven through sprockets 135 and 136, and chain 138 from a source of power which may be an independent motor 140. Tension in the belt may be adjusted through the adjustable idle roll 142 supported between bearing brackets 144 and which presses against the slack side of the belt. In order to maintain the surface of the belt free of any coating material or other foreign material that may have adhered to it in operation, a revolving brush 144 is positioned in contact with the conveying face of the slack side of the belt and removes such material as may have accumulated. The brush is supported in bearing brackets 146, rigidly connected to the side frames and preferably has its motion opposed to that of the belt. In the illustrated embodiment the belt is disclosed as one of a single width and extending the full width of the machine. It will be understood, however, that this element may comprise a plurality of separate belts, abutted or spaced desired distances apart.

For the purpose of guiding the products to be treated past the coating units or more particularly therefrom, the machine is provided with adjustable longitudinal guides 148 having flat side faces 150 between which the fed material may be guided in its motion. In the exemplified construction one of said guides is positioned on each side of the machine and is supported by suitable brackets 152 to the machine side frames. The brackets are provided with elongated slots 154 permitting adjustment of the guides to any transverse position across the width of the machine. Moreover, the lower edge of the guide is so positioned as to substantially contact the top face of the conveyor belt. While the guides are shown in the drawings at one end of the machine only, it will, of course, be understood that additional guides may be provided at the opposite end or at any portion throughout the length of the machine where they may be desired.

It has been previously presented that the exemplified coating units 128 and 130 are capable of producing thin or thick coatings and applying a sludgy composition in a uniform manner. Moreover, that a plurality of thin applications has been found to produce a much better coating structure, particularly where, as in the preferred operation of this invention, a sludgy composition such as a wet cement which may comprise fine and coarse aggregates is fed. In order to continuously apply a plurality of such coatings, one of which may be a color coat, a plurality of these coating units may be provided. In the illustrated construction two such units 128 and 130 are shown, but it will be understood that additional units may be employed where they are desired. Also a single unit only may be employed if the particular operation does not require the characteristics that a multiple operation will provide. Furthermore, it will be seen that where a plurality of units are employed the impeller members face away from the machine extremities, i. e. toward each other. Several advantages are obtained by this arrangement. The material is impelled in two directions and insures complete coverage of a surface comprising a plurality of projections. Also, when impelling a composition composed of materials of different size, the coarse material is not thrown as far as the fines and the surface of the article may vary somewhat in the relative strata positioning of the coarse and fines. By the illustrated operation providing at least two applications of coating the second application appears to overcome any unbalance and produces a uniform surface effect throughout. Furthermore, while the exemplified units direct the coating composition at an angle substantially to the vertical of the surface to be treated and do not therefore cast such material a great distance as respects the length of the machine, it will be appreciated that if the impelling elements face the ends of the machine, that an operator may readily inhale any dust or suspended particles of composition, which may in time be injurious to his health. The exemplified positioning of the coating units, therefore, has the further advantage of confining throwing of the composition to a space where it will be less harmful to any operator. Where a single unit is employed it is preferred that the feed end of the machine face the rear side wall of the hopper.

A further feature of the disclosed apparatus resides in the ability to feed the material to be treated from either end of the machine. Moreover, the unit may comprise one in series with other apparatus to form a continuous manufacturing process. For example, at one end of the machine may be a unit 156 for operating upon the surface of the material to be treated, such as, for instance, the corrugating or embossing of a sheet or even the manufacture of a base for a roofing product to which the instant invention is particularly directed. At the opposite end of the machine also not shown, but indicated by the numeral 158 may be a suitable cutting device and/or a stacking device for further operating upon the material that has been treated. Particular elements of this character have been disclosed in the Harshberger patent and application, supra, and it is desired to be understood that such elements and the various operations provided by them may be included as an integral part of the exemplified construction, or as additional units.

In the operation of the apparatus a batch of sludgy material is fed to the coating hoppers. For the purpose of coating roofing material for which the exemplified apparatus is particularly useful, the composition may be, for example, one including hydraulic cement, aggregate, for instance, sand or marble dust, and sufficient water to give the mixture a slump of approximately between 6½ to 7½ inches according to the A. S. T. M. cement slump test. Such material is thoroughly mixed and fed to the hopper, whereupon it passes out of the hopper between the nip of the hopper feed or discharge roll and the gate roll and is conducted away upon the surface of the hopper feed roll to the impelling device which removes the material and spreads it over the article to be treated. Depending upon the thickness of coating desired, the gate roll and impeller rolls are suitably adjusted. Likewise, the impeller may require adjustment for different coating composition mixes. While sludgy compositions such as one comprising a wet cement may be used, it is believed that other types of materials such as sugar frosting, etc. may be employed with satisfactory results.

In the exemplified construction the coating devices 128 and 130 have been independently driven. This is believed advantageous, as in certain instances each device may feed a different composition or it may be desired to feed different quantities and the speed of operation may therefore be readily varied by motor speed control devices without altering the gearing. Also, since the feed and distribution elements are related it is thought desirable to drive such members from a separate source of power, which may be a motor. Speed of operation will, of course, depend upon the type of sludgy coating composition, the relative movement of the material to be treated and the thickness of coating to be applied in a single application. The proper requirements will be readily ascertained in actual operation. The exemplified apparatus has been used with satisfactory results at relative speeds for material to be treated, of 150 and 200 feet per minute.

In the foregoing description and in the following claims various details are referred to by specific terms for convenience. These terms, however, are to be given as broad an interpretation as the state of the art will permit.

Moreover, it will be obvious that various modifications may be made in the exemplified apparatus and process of materials used without departing from the spirit of my invention which I desire to construe as broadly as the following claims taken in conjunction with the prior art, may allow. The details of construction have been given for illustration, not restriction.

I claim:

1. Apparatus for applying sludgy material to a surface comprising a fountain for said material, a rotating feed roll adapted to withdraw quantities of said material from the fountain, a rotating gate roll to control the quantity of material withdrawn, means to adjust the gate roll both away from and about the surface of the discharge roll, and means to distribute the material to the surface.

2. Apparatus for applying sludgy material to a surface comprising a fountain for storing a quantity of said material, means for continuously withdrawing predetermined quantities of sludge including a withdrawing roll and a driven gate roll in close proximity to the withdrawing roll and rapidly moving means for removing the material from the withdrawing roll, said gate roll being above the horizontal center line of the withdrawing roll and said material removing means positioned close to the surface to be treated and on the same side of the vertical center line as said gate roll.

3. Apparatus for applying sludgy material to a surface comprising a fountain for storing a quantity of said material, means for continuously withdrawing predetermined quantities of sludge including a withdrawing roll, a resilient gate roll in close proximity to the withdrawing roll and impeller means out of contact with said surface for removing the material from the withdrawing roll and applying it to said surface.

4. Apparatus for applying sludgy material to a surface comprising a fountain for storing a quantity of said material, means for continuously withdrawing predetermined quantities of sludge including a withdrawing roll, a rubber faced gate roll in close proximity to the withdrawing roll and impeller means out of contact with said surface for removing the material from the withdrawing roll and applying it to said surface.

5. Apparatus for delivering material to a distributing means comprising a material distributing means, a hopper for supplying material to the distributing means and a movable partition means out of direct contact with the distributing means for causing delivery of material over a part or whole of said distributor, and a cover plate in connection with said partition to cover the hopper above that portion of the distributor not fed with material.

6. Apparatus for delivering material to a distributing means, comprising a material distributing means, a hopper for supplying material to the distributing means, a pair of movable walls for distributing means, a pair of movable walls for causing delivery of the material over a predetermined extent of the distributor, said walls being guided in the sides of the hopper and supported so as not to directly contact the distributing means.

7. The method of overcoming streaking when feeding a layer of sludgy material to a receiving face from a source of supply of sludgy material containing solid matter of greater thickness than the layer to be fed, and which source of supply includes a pair of spaced surfaces from which to feed the said layer, comprising feeding a layer of said sludgy material from between said spaced surfaces, moving both of said surfaces in the same relative direction, moving one surface at a speed relative to the second whereby the oversize matter may be gripped by said surfaces, momentarily deflecting one of said surfaces to accommodate the oversize matter and ejecting said oversize matter with the fed layer.

8. Apparatus for applying sludgy material to a surface, which comprises means to move a surface in a predetermined path, a source of supply for sludgy material, withdrawal means movable through said source of supply to remove sludgy material therefrom, forming and trowelling means at the position of discharge of said withdrawal means to produce a continuous layer of said sludgy material upon said withdrawal means and smoothen and measure said layer while forming the same, and means to project particles of said formed and trowelled layer of sludgy material from said withdrawal means to said moving surface.

9. Apparatus for feeding sludgy material, comprising supply means, withdrawal means having a movable face upon which to remove sludgy material from said supply means, gate means having a movable face positioned relative to the moving face of said withdrawal means to measure the mass of sludgy material passing between them and carried by said withdrawal means, the face of said gate means being resilient and adapted to deflect to permit passage of oversize solid matter contained in said sludgy material not normally passable, and means to operate said withdrawal means and gate means faces in the same relative direction and at such relative speed whereby the oversize solid matter carried by said withdrawal means may be gripped between said faces and ejected with the fed mass.

10. Apparatus for applying a hydraulic cement composition to a surface, comprising a hopper for said composition, a driven rotatable feed roll positioned to receive said composition from said hopper and continuously remove a layer thereof from the hopper, a driven resilient gate to continuously form said layer on said feed roll, and impeller means out of contact with said surface to continuously transfer the composition comprising said layer from said feed roll to said surface.

11. Apparatus for applying sludgy material to a surface comprising a container for sludge, a driven rotary sludge withdrawing device at the bottom of said container, a driven resilient rotary gate for forming a measured layer of sludge on said withdrawing device, means to rapidly alter the direction and speed of said rotary gate, and impeller means to remove said sludgy material from the withdrawal means and throw it against said surface.

12. Apparatus for handling sludgy material comprising a container for the sludgy material, withdrawal means movable through the container to remove sludge from the container, rotary resilient forming means to produce a measured layer of sludgy material on said withdrawal means as it leaves the container, driving means for said resilient forming means, a clutch between said forming means and driving means, means to operate said clutch to throw said resilient forming means out of drive, and means to manually operate said resilient forming means.

13. Apparatus for applying sludgy material to a surface comprising a fountain for storing a quantity of said material, means for continuously withdrawing predetermined quantities of said material from said fountain, including a withdrawing roll having circumferential recesses and a driven gate roll in close proximity to the withdrawing roll, and rotary impeller means out of contact with said surface for removing the material from the withdrawing roll and discharging the same upon said surface, said rotary removing means and driven gate roll positioned on the same side of a vertical center line through said withdrawal roll and said withdrawal roll and gate roll having opposite directions of rotation.

14. Apparatus for feeding sludgy material to a surface comprising a fountain for storing a quantity of said material, a rotary feed roll forming the bottom of said fountain and a rotary gate and trowelling roll cooperating with the first roll to control the quantity of material removed by the first roll from said fountain, the size of said feed roll and gate roll being in the order of about 14 to 8, means to drive said gate roll in the direction of discharge of said material upon the feed roll, and impeller means out of contact with said surface to transfer the material from said feed roll to said surface.

15. Apparatus for feeding sludgy material to a surface comprising a fountain, a rotary roll for withdrawing material from the fountain, a rotary rubber faced roll substantially in relation with the first roll to control the amount of material withdrawn by said first roll, said rolls forming the lower part of the fountain, and impeller means out of contact with said surface to remove said material from the first roll and project it against said surface.

16. Apparatus for continuously feeding predetermined quantities of sludgy material from a source of supply to a moving base comprising means to move the base, a hopper for storing the sludgy material, a moving surface for conveying said material from the hopper, means to move said material conveying surface, a rotary rubber faced measuring and trowelling roll to cooperate with said material conveying surface to form and discharge a continuous measured layer of the sludgy material thereon for transfer to said base, means to rotate said measuring and trowelling roll, and impeller means out of contact with said surface to transfer said material from the material conveying surface to said moving base.

17. Apparatus for delivering material to a material feed means, comprising a hopper for supplying material to the feed means, a feed means positioned at the outlet of said hopper, and a movable partition means out of direct contact with the feed means determining the size of said outlet and movable in a direction normal to the face of said partition means whereby to cause delivery of material in said hopper over a part or whole of said feed means.

18. The method of feeding and applying a sludgy material to a surface, which comprises providing a source of supply of sludgy material, feeding and moving a portion of said material from said supply to a point adjacent said surface, trowelling the moving material while removing it from the source of supply to feed a predetermined mass and forcibly depositing said mass over said surface.

19. The method of feeding and applying a sludgy material to a surface, which comprises providing a source of supply of sludgy material, continuously feeding a portion of said sludgy material from said supply, trowelling the material while removing it from the source of supply to form a predetermined layer thereof, moving said layer to a point adjacent said surface, dividing the material of said layer into particle form, and directing a continuous stream of said particles of sludgy material to the surface.

20. The method of feeding and applying a sludgy material to a surface, which comprises providing a source of supply of sludgy material, feeding a portion of said sludgy material from said supply, trowelling the material while removing it from the source of supply to form a predetermined layer thereof, moving said layer along an arcuate path to a point adjacent said surface, dividing the material of said layer into particle form and projecting said particles upon said surface to form a coating therefor.

21. The method of applying a sludgy material to a surface, which comprises providing a source of supply of sludgy material, feeding a plurality of portions of said sludgy material from said supply, trowelling said portions while removing them from the source of supply to form predetermined masses thereof, moving each of said trowelled masses to a point adjacent said surface, dividing the material of said moving masses of material into particle form and directing streams of said particles to said surface along non-parallel paths.

22. Apparatus for applying sludgy material to a surface comprising a hopper for storing a quantity of said material, a pair of movable members between which to withdraw predetermined quantities of said material from the hopper, one of said members serving to convey the material and the second having a resilient face, and serving to trowel said material into a predetermined mass, means to move said members and impeller means out of contact with said surface, to remove said material from the conveying member and apply it to said surface.

THOMAS BRADY.